Dec. 6, 1955     R. BERNHARDT     2,726,071
MIXER AND AERATOR
Filed Nov. 14, 1952     3 Sheets-Sheet 1
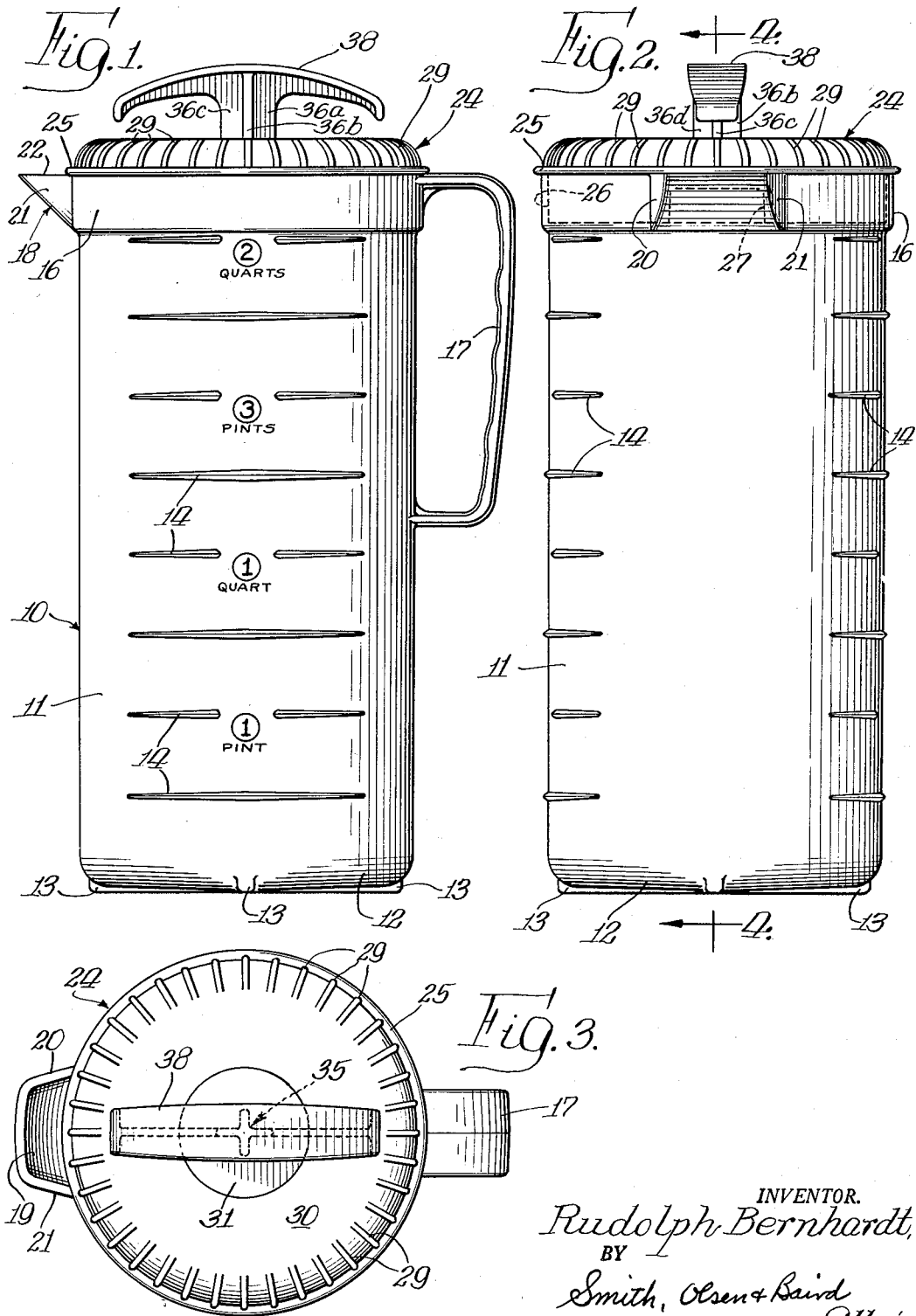
INVENTOR.
Rudolph Bernhardt,
BY
Smith, Olsen & Baird
Attys.

Dec. 6, 1955  R. BERNHARDT  2,726,071
MIXER AND AERATOR
Filed Nov. 14, 1952  3 Sheets-Sheet 2
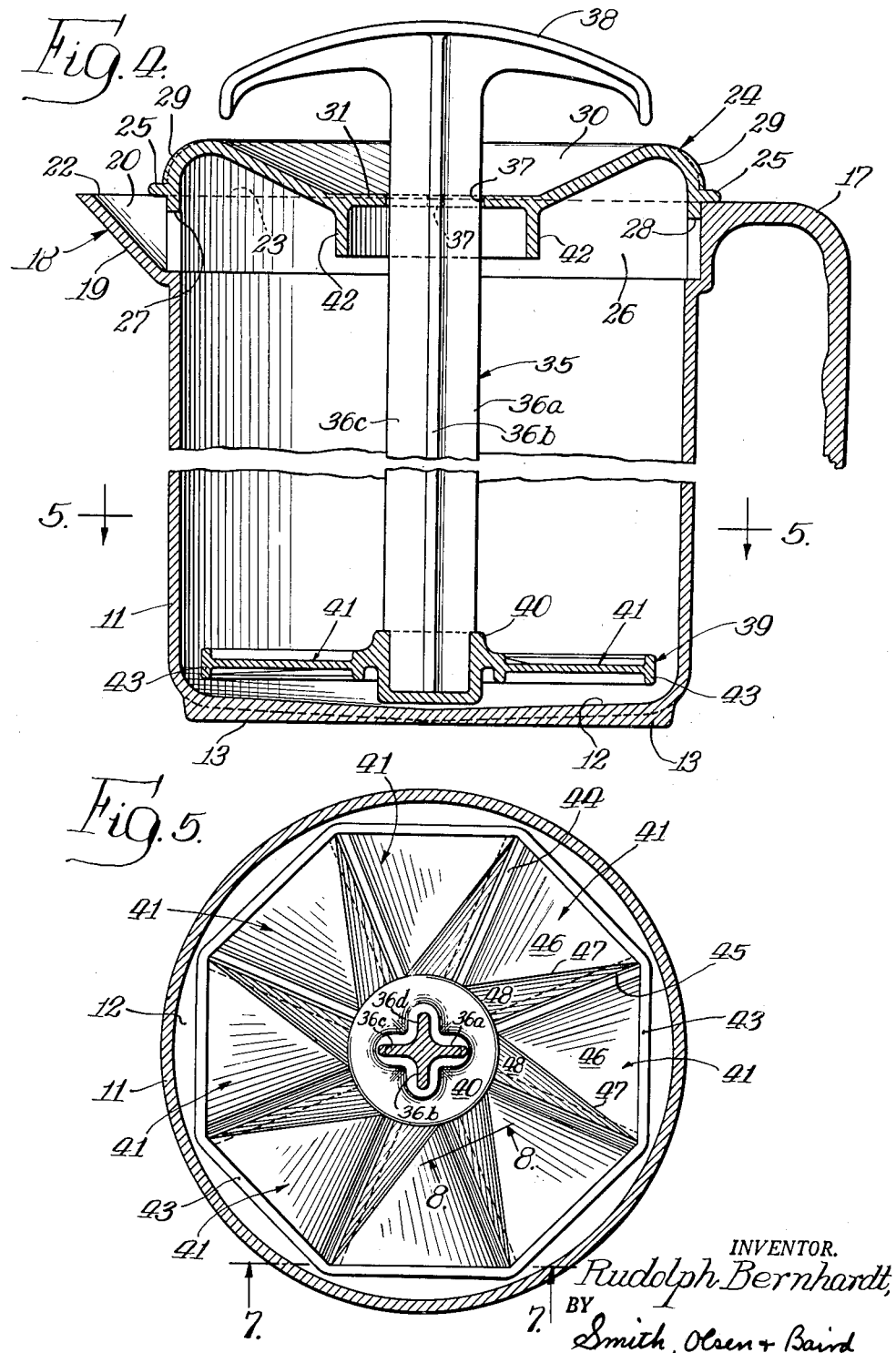
INVENTOR.
Rudolph Bernhardt,
BY Smith, Olsen + Baird
Attys.

Dec. 6, 1955

R. BERNHARDT 2,726,071

MIXER AND AERATOR

Filed Nov. 14, 1952

INVENTOR.
Rudolph Bernhardt,
BY
Smith, Olsen + Baird
Atty's.

United States Patent Office 2,726,071
Patented Dec. 6, 1955

---

2,726,071

MIXER AND AERATOR

Rudolph Bernhardt, Evanston, Ill.

Application November 14, 1952, Serial No. 320,403

1 Claim. (Cl. 259—113)

The present invention is related to devices for mixing and aerating liquids and semi-liquids and pertains more particularly to an improved mixer and aerator for liquid and semi-liquid food products, the device having particular utility in household uses.

The relatively recent introduction upon the food market of powdered milk, partly dehydrated or "condensed" frozen fruit juices and other prepared ingredients for liquid food products has given rise to the need for a simple but effective means for mixing these concentrated powders, liquids and semi-liquids with water and for aerating the mixtures prior to consumption. Ordinarily the manufacturer or the packer of the concentrated food products instructs the consumer as to the amount of water to be added to the concentrates and sometimes the packer has suggested that the taste of the resultant mixtures may be materially improved if the mixtures are poured back and forth from one vessel to another in order that they may be aerated to give them a "fresh," natural taste. However, this method of aerating and mixing the food products has obviously been inconvenient and troublesome, with the result that many consumers have continued to prefer the purchase of the more expensive fresh products or have used the concentrated products in their non-aerated state, broadly attributing their somewhat flat and unnatural taste to the mere fact that they have been canned, frozen or powdered, as the case may be.

One of the principal objects of the present invention is to provide a relatively inexpensive but highly effective mixer and aerator that may be used for mixing and aerating food products of the kind referred to above, as well as many others, and for conveniently storing them in a refrigerator or the like until they are served for consumption. Another object of the present invention is to provide a mixer and aerator of improved efficiency wherein the contents of the mixer are violently agitated in an outwardly and upwardly swirling path by a non-rotating impeller to cause mixing of the contents and to cause intermixture of air therewith. Still another object of the invention is to provide a mixer and aerator of the kind just stated having novel means to prevent escape of liquid from the mixer during violent motion of its contents. A further object of the invention is to provide a mixer and aerator embodying all of the aforesaid characteristics and having therein an impeller very light in weight but very strong and of highly improved efficiency. Yet another object of the invention is to provide a mixer and aerator of the kind stated that may be fabricated inexpensively and, if desired, entirely of plastic. A further object of the invention is to provide a mixer and aerator that may be used for storing liquid food products as well as for serving the same.

These and other objects and advantages of the present invention will be apparent from the following description of a preferred embodiment thereof, taken with the accompanying drawings wherein:

Fig. 1 is an elevational side view of a preferred form of the mixer and aerator;

Fig. 2 is a front elevational view thereof;

Fig. 3 is a top plan view of the mixer and aerator;

Fig. 4 is a vertical cross-section on a somewhat enlarged scale taken substantially on the line 4—4 in Fig. 2, the central portion of the mixer and aerator being broken away for convenience in illustration;

Fig. 5 is a cross-section taken on the line 5—5 in Fig. 4;

Fig. 6 is a fragmentary cross-sectional view taken on the same line as Fig. 4 but showing the action of the impeller on the liquid contents of the container and showing the outwardly and upwardly swirling motion of the liquid when the impeller is moved downwardly;

Fig. 7 is a fragmentary cross-section taken on a still larger scale on the line 7—7 in Fig. 5, showing in detail the construction and shape of one of the blades of the impeller; and Fig. 8 is a similar cross-section taken on a greatly enlarged scale on the line 8—8 in Fig. 5 to show the relative pitches and positions of the different portions of the blades of the impeller.

In the drawings the numeral 10 designates generally an upright, open top cylindrical container having an upstanding side wall 11 and a slightly rounded bottom 12 on the lower side of which there are formed a plurality of radially disposed ribs 13 upon which the container may rest when placed on a table or the like. The container may be conveniently formed or molded of transparent plastic, and volumetric indices 14 may be embossed in horizontal positions on the outside of the vertical wall 11 of the container to indicate the volume of liquid, designated generally by the numeral 15, located within the container.

A ring is molded or otherwise formed around the upper edge of the container and integral therewith to provide an upstanding circular flange 16 having an inside diameter somewhat greater than the inside diameter of the container 10. A generally C-shaped handle 17 is formed on the container on one side thereof, the upper end of the handle being connected by fusion or otherwise to the outside of the flange 16 and its lower end being similarly secured to the outside of the wall 11 of the container, as best shown in Fig. 1. Opposite the handle 17 the flange 16 has a pouring lip 18 formed thereon comprising an outwardly flared diagonally disposed bottom wall 19 and two slightly divergent side walls 20 and 21, the upper edge 22 of this pouring lip coinciding with the upper edge 23 (Fig. 4) of the flange 16.

A removable circular cap designated generally by the numeral 24 is provided for closing the upper end of the container. This cap may be molded of plastic and is provided with an outwardly extending peripheral flange 25 that is adapted to seat downwardly and rotatably on the upper edge 23 of the flange 16 at the top of the container. The cap 24 is also provided with a downwardly extending peripheral skirt 26 which mates with the corresponding inside surface of the flange 16 of the container when the cap is seated in closed position on the top of the container as best seen in Figs. 1 to 4 and in Fig. 6. The downwardly extending skirt 26 is imperforate except for two identical, substantially rectangular, openings 27 and 28 formed therein and disposed opposite each other. These openings 27 and 28 have a width substantially equal to the space between the converging side walls 20 and 21 of the pouring lip 18 and their vertical dimensions are somewhat less than the height of the rim or flange 16 on the container.

It will be understood that the circular cap 24 may be manually rotated on the top of the container without removing the same therefrom, and for assisting in this rotation the rounded upper edge of the cap may be provided with a plurality of attractive, evenly spaced radially disposed ribs 29 that produce increased friction between the cap and the hand and also lend structural strength to the cap. In its normal position and when the liquid contents of the container are to be agitated in the manner about to be described, the cap 24 is disposed in a rotative position on the top of the container wherein the openings 27 and 28 are located remotely with respect to the pouring lip 18. It will be noted that when the cap 24 is in this position the peripheral skirt 26 thereon closes the pouring lip 18 and prevents liquid from being splashed or otherwise expelled through the lip. When the cap is in this closed position, it also effectively seals the container and thus prevents the contents of the container from absorbing foreign tastes from the interior of a refrigerator or the like in which the container and its contents may be stored until the contents are to be consumed. On the other hand, when it is desired to pour the contents from the container, the cap 24 may be quickly rotated to the position best illustrated in Figs. 2 and 4 wherein one of the openings 27 or 28 is disposed opposite the pouring lip 18, thus opening the lip and permitting the contents to be poured from the container through the opening 27 or 28, as the case may be, and over the pouring lip 18.

The top wall 30 of the cap 24, within the area defined by the numerous short ribs 29, is shaped to provide a substantial depression concentrically located with respect to the center of the cap. In providing this formation it will be seen, particularly in Figs. 4 and 6, that the wall 30 is generally of the shape of the surface of an inverted truncated cone, the center portion 31 of the wall 30 being circular and planar and being located well below the other portions of the top of the cap.

Within the container and coinciding with the axis thereof, there is an upstanding plunger rod designated generally by the numeral 35. This plunger rod, like all of the other parts of the mixer and aerator, may be formed of plastic and in construction comprises four outwardly extending radially disposed webs 36a, 36b, 36c and 36d, giving to the plunger rod a cross-sectional configuration similar to a cross (Fig. 5). The upper end of the rod 35 slidably extends through the cap 24 at the center portion 31 thereof, the cap 24 being provided with a cross-shaped opening 37 (Fig. 4) conforming to the cross-sectional shape of the rod. The uppermost end of the rod has a handle 38 formed integrally thereon by which the plunger rod may be manually reciprocated up and down in a vertical direction. The coaction of the webs 36a, 36b and 36d with the cross-shaped opening 37 in the cap serves to prevent relative rotation of the rod with respect to the cap.

An impeller designated generally by the numeral 39 is fixedly mounted upon the lower end of the plunger rod 35 within the container. This impeller 39 comprises a hub 40 that is of such size and shape as to receive the lower end of the rod 35. Extending radially outwardly from the hub 40 there are a plurality of fixed, pitched blades 41 which are so shaped and positioned that downward motion of the plunger rod 35 forces the liquid 15 in the container violently radially outwardly and upwardly in a swirling spiral motion along the vertical walls of the container and upwardly and inwardly against the downwardly sloping underside of the wall 30 of the cap 24 as shown in Fig. 6. In order to avoid projection of the liquid through the loosely fitting cross-shaped opening 37 in the cap through which the plunger rod 35 is reciprocated, the underside of the cap is provided with a downwardly extending circular flange 42 which is located concentrically about the opening 37 and which blocks and breaks the swirling path of the liquid adjacent the plunger rod 35 at the place where it extends through the cap 24. Any liquid that may pass through the opening 37 is momentarily retained in the depressed center portion of the top of the cap until it can drain back into the container through the opening. It may also be noted that the depression in the central portion of the top of the cap 24 serves a further purpose in that it provides space for the fingers of the operator when the plunger rod 35 is at the bottom of its stroke, thus permitting the use of a shorter plunger rod than would otherwise be the case.

Although numerous variations may be made in the impeller 39 within the scope of the present invention, the preferred form of the impeller illustrated in the drawings comprises an equilateral, octagonal, eight bladed single piece structure formed of plastic or other suitable material, having as its greatest transverse measurement a dimension slightly less than the internal diameter of the container 10. It will thus be understood that the impeller, in being reciprocated upwardly and downwardly within the container, will be guided by contact with the inner surface of the vertical wall 11 of the container but will not bind thereon.

Each of the eight blades 41 of the impeller are identical, each being integral at its root with the hub 40 and each being integral at its tip with an octagonal rim 43 which defines the peripheral shape of the impeller and serves to strengthen the blades and the impeller structure. Each of the blades is provided with straight, radially disposed lateral edges 44 and 45 which may be beveled, as best shown in Figs. 7 and 8. The straight lateral edge 44, which for convenience may be called the leading edge (in spite of the fact that the impeller in operation is not rotated), is located generally in a first plane normal to the axis of the plunger rod 35, and the other straight lateral edge 45, which may be called the trailing edge, is generally disposed in a plane also normal to the axis of the plunger rod but spaced below the first plane. This relative disposition of the straight, radially extending lateral edges 44 and 45 of each blade in parallel planes, one above the other, defines a blade having a greater pitch at its root than at its tip, a condition which is a characteristic of each of the blades 41 in the impeller 39, as best illustrated in Fig. 7. The blades 41, however, each have a further structural feature that retains this advantageous characteristic and at the same time greatly simplifies and reduces the expense of their manufacture. Each of the blades is comprised of two planar triangular segments, one segment having a greater pitch than the other. The first of these triangular segments, designated in the drawings by the numeral 46, includes the larger part of the area of the blade and is defined by the lateral edge 44 of the blade, the tip of the blade, and a line 47 which extends diagonally across the body of the blade, from the junction of the lateral edge 45 and the tip, to the junction of the lateral edge 44 with the hub 40. The second of these triangular segments, designated by the numeral 48 in the drawings, is integrally joined with the segment 46 along the line 47 and comprises the root and trailing edge portion of the blade. As best seen in Figs. 7 and 8, this latter triangular segment 48 of the blade has a greater pitch than the principal segment 46, an arrangement which results in forcing the liquid 15 in the container in an upwardly and outwardly swirling path when the impeller is moved downwardly.

The liquid located above the impeller when the impeller is moved upwardly on its return stroke tends to follow a similar swirling path in a downward direction as it passes downwardly between the spaces 49 (Fig. 8) between the lateral edge 44 of one blade and the lateral edge 45 of the next adjacent blade. This return of the liquid to the bottom portion of the container, however, is materially hastened by passage of liquid downwardly through the plurality of spaces between the sides of the octagonal rim 43 and the inner surface of the wall 11 of the container.

The foregoing description of one embodiment of the present invention has been set forth in order that the invention may be more fully understood, but no unnecessary limitations are intended thereby, for it will be appreciated by those skilled in the art that numerous variations and modifications may be made in the present mixer and aerator within the scope and spirit of the appended claim.

I claim:

An impeller for mixing and aerating liquids and the like in a closed upright container having an aperture in the top thereof and receiving therethrough an upstanding reciprocating plunger rod, comprising a hub fixedly secured to the lower end portion of said rod within the container, an outer rim substantially conforming to the interior transverse dimensions of the container, and a plurality of pitched blades extending radially from said hub and carrying said rim, the body of each of said blades comprising a pair of radially extending generally triangular planar body segments of different pitch integrally joined edge to edge along a line extending diagonally across the blade, that triangular segment having the greatest pitch being arranged with its apex directed outwardly and its base extending circumferentially of and being joined to said hub to provide the root of said blade and extending outwardly from said hub to provide one longitudinal edge portion of said blade, the triangular segment having the lesser pitch providing the other longitudinal edge portion of said blade and being arranged with its apex directed inwardly and with its base secured to said rim and defining the tip portion of said blade.

References Cited in the file of this patent

UNITED STATES PATENTS

| 786,525 | Simons | Apr. 4, 1905 |
| 1,762,353 | Robinson | June 10, 1930 |
| 1,881,361 | Killman | Oct. 4, 1932 |
| 2,291,708 | Gluck | Aug. 4, 1942 |

FOREIGN PATENTS

| 355,085 | Great Britain | Aug. 20, 1931 |
| 682,341 | France | May 26, 1930 |